(12) United States Patent
Reveret et al.

(10) Patent No.: US 11,528,923 B2
(45) Date of Patent: Dec. 20, 2022

(54) WET PET FOOD PALATABILITY-ENHANCING COMPOSITION

(71) Applicant: SPECIALITES PET FOOD, Elven (FR)

(72) Inventors: Elodie Reveret, Elven (FR); Caroline Lacotte, Plumergat (FR)

(73) Assignee: SPECIALITES PET FOOD, Elven (FR)

( * ) Notice: Subject to any disclaimer, the term of this patent is extended or adjusted under 35 U.S.C. 154(b) by 456 days.

(21) Appl. No.: 16/309,865

(22) PCT Filed: Jun. 14, 2017

(86) PCT No.: PCT/EP2017/064575
§ 371 (c)(1),
(2) Date: Dec. 13, 2018

(87) PCT Pub. No.: WO2017/216240
PCT Pub. Date: Dec. 21, 2017

(65) Prior Publication Data
US 2020/0154736 A1    May 21, 2020

(30) Foreign Application Priority Data
Jun. 14, 2016   (EP) .................................. 16305716

(51) Int. Cl.
| A23K 50/48 | (2016.01) |
| A23K 20/147 | (2016.01) |
| A23K 20/163 | (2016.01) |
| A23K 20/26 | (2016.01) |
| A23K 40/10 | (2016.01) |

(52) U.S. Cl.
CPC ............ *A23K 50/48* (2016.05); *A23K 20/147* (2016.05); *A23K 20/163* (2016.05); *A23K 20/26* (2016.05); *A23K 40/10* (2016.05)

(58) Field of Classification Search
CPC .... A23K 50/48; A23K 20/147; A23K 20/163; A23K 20/26; A23K 40/10
See application file for complete search history.

(56) References Cited

U.S. PATENT DOCUMENTS

2009/0098267 A1    4/2009  Pettelot et al.

OTHER PUBLICATIONS

International Search Report, issued in PCT/EP2017/064575, dated Aug. 2, 2017.
Written Opinion of the International Searching Authority, issued in PCT/EP2017/064575, dated Aug. 2, 2017.

*Primary Examiner* — Katherine D Leblanc
(74) *Attorney, Agent, or Firm* — Birch, Stewart, Kolasch & Birch, LLP

(57) ABSTRACT

The present invention relates to a wet pet food palatability-enhancing composition comprising at least: —one or more free amino acids A1, —one or more sugars A2, and —one or more inorganic phosphate compounds B with an amount P of phosphorus, wherein the amount P of phosphorus is from 1% to 5% based on the total weight of said wet pet food palatability-enhancing composition, and wherein the ratio R1 of A1/(A1+A2+P) is superior to 0.30. The present invention also relates to a method for producing this wet pet food palatability-enhancing composition as well as a wet pet food having enhanced palatability comprising this wet pet food palatability-enhancing composition.

16 Claims, No Drawings

WET PET FOOD PALATABILITY-ENHANCING COMPOSITION

The present invention generally relates to the field of wet pet food.

More precisely, the present invention concerns a wet pet food palatability-enhancing composition having a low phosphorus amount and a specific ratio of free amino acids, sugars, and phosphorus.

BACKGROUND OF THE INVENTION

Pets are well taken care of by their owners who provide them a proper selection of foods. There is a wide range of pet foods available on the market. These pet foods may be classified in different categories depending on their consumption purpose: (a) nutritionally-balanced diets, (b) complementary diets, and (c) snacks, treats, and edible toys. Nutritionally-balanced diets can in turn be classified in three main categories depending on their moisture content: dry, semi-moist (or semi-dry or soft dry or soft moist), and wet (or canned) pet foods. Dry pet foods, such as kibbles, typically have a moisture content of less than 14% and generally have a dry, crunchy texture when chewed by pets. Semi-moist pet foods typically have a moisture content in the range of 14 to 50%. Wet pet foods generally have a moisture content above 50%, and often around 80%.

Facing an increasing public demand for pet foods, the pet food industry looks for supplying nutritionally-balanced diets which have a high degree of palatability. Pets, like humans, are attracted to and eat more regularly and easily foods which they find palatable.

Therefore, palatability-enhancing compositions are extremely important for animal consumption and a large number of palatability enhancers have been described so far. These palatability enhancers generally differ according to the targeted pets, such as cats or dogs, the category of the nutritionally-balanced diet etc. Indeed, a palatability-enhancing composition palatable to cats is usually not palatable to dogs and vice versa. Moreover, a palatability-enhancing composition effective in dry pet foods is usually not effective when used in semi-moist or wet pet foods and vice versa.

Regarding cats, typical palatability-enhancing compositions comprise inorganic phosphate compounds. Indeed, it has been largely demonstrated that inorganic phosphate compounds significantly enhance palatability to cats.

As an example, disodium pyrophosphate (U.S. Pat. No. 5,186,964), trisodium pyrophosphate (U.S. Pat. No. 7,186,437), tetrasodium or tetrapotassium pyrophosphate (U.S. Pat. Nos. 6,254,920; 6,350,485; US 2005/0037108) are commonly used to this end.

These inorganic phosphate compounds represent the main source of phosphorus in the palatability-enhancing composition, and thus in pet foods, in particular wet pet foods.

However, high amounts of phosphorus are sometimes to be restricted, for example when kidney function is on decline, such as in the case of renal diseases. As for today, decreasing the amount of inorganic phosphate compounds comes to a loss of palatability of pet foods to cats.

There is therefore a need for palatability-enhancing compositions, which provide high attractiveness to pets when used in wet pet foods despite a limited amount of phosphorus originating from inorganic phosphate compounds.

The present invention precisely addresses this need by providing new compositions having a low amount of phosphorus and which are able to enhance palatability of wet pet food.

SUMMARY OF THE INVENTION

The present invention relates to a wet pet food palatability-enhancing composition comprising at least:
- one or more free amino acids A1,
- one or more sugars A2, and
- one or more inorganic phosphate compounds B with an amount P of phosphorus,
- wherein the amount P of phosphorus is from 1% to 5% based on the total weight of said wet pet food palatability-enhancing composition, and
- wherein the ratio R1 of A1/(A1+A2+P) is superior to 0.30.

The present invention also relates to a method for producing this wet pet food palatability-enhancing composition, said method comprising the steps of:
a) providing said at least one or more free amino acids A1, one or more sugars A2, and one or more inorganic phosphate compounds B;
b) if necessary, grinding one or more of said ingredients of step a);
c) mixing said ingredients obtained from step a) and/or b); and
d) obtaining said wet pet food palatability-enhancing composition.

The present invention also relates to a wet pet food having enhanced palatability comprising a wet pet food palatability-enhancing composition.

Definitions

Unless specifically stated otherwise, ratios, amounts or percentages are expressed herein by total weight of a product reference.

In the present disclosure, ranges are stated in shorthand, so as to avoid having to set out at length and describe each and every value within the range. Any appropriate value within the range can be selected, where appropriate, as the upper value, lower value, or the terminus of the range. For example, a range of 0.1-1.0 (from 0.1 to 1) represents the terminal values of 0.1 and 1.0, as well as the intermediate values of 0.2, 0.3, 0.4, 0.5, 0.6, 0.7, 0.8, 0.9, and all intermediate ranges encompassed within 0.1-1.0, such as 0.2-0.5, 0.2-0.8, 0.7-1.0, etc. Moreover, the terms "at least" and "less than" encompass the hereafter cited value. For example, "at least 5%" has to be understood as also encompassing "5%".

Moreover, in the present invention, measurable values, such as an amount, have to be understood as encompassing standard deviations which can easily be determined by the skilled person in the technical domain of reference. Preferably, these values are meant to encompass variations of ±2%, more preferably ±1% from the specified value, as such variations are appropriate to reproduce the disclosed methods and products.

In the present disclosure, all of the possible ranges have not been explicitly mentioned so as to avoid having to set out at length and describe each and every value within the range. However, the ranges and ratio limits recited herein are combinable. For example, if ranges of 1-20 and 5-15 are recited for a technical feature, it is understood that ranges of 1-5, 1-15, 5-20 or 15-20 are also contemplated and encompassed thereby. This also applies on values illustrating lower and upper limits. A value illustrating a lower limit is thus combinable with a value illustrating an upper limit so as to form a ratio. For example, if a particular embodiment relates to the ratio X being superior to 2 and another particular embodiment relates to the ratio X being inferior to 5, it is understood that range of 2-5 is also contemplated and encompassed thereby.

The term "out of ratio" as used in the present invention means that the expressed ratio is outside from the ranges of ratios according to the present invention.

As used throughout, the singular form of a word includes the plural, and vice versa, unless the context clearly dictates otherwise. Thus, the references "a", "an", and "the" are generally inclusive of the plurals of the respective terms. For example, reference to "a method" or "a food" includes a plurality of such "methods" or "foods". Similarly, the words "comprise", "comprises", and "comprising" are to be interpreted inclusively. Likewise the terms "include", "including" and "or" should all be construed to be inclusive. All these terms however have to be considered as encompassing exclusive embodiments that may also be referred to using words such as "consist of".

The terms "comprising" or "including" are intended to include embodiments encompassed by the terms "consisting essentially of" and "consisting of".

The methods and compositions and other embodiments exemplified here are not limited to the particular methodologies, protocols, and reagents that are described herein because, as the skilled artisan will appreciate, they may vary.

Unless defined otherwise, all technical and scientific terms, terms of art, and acronyms used herein have the meanings commonly understood by the skilled artisan in the field(s) of the invention, or in the field(s) where the term is used. Although any products, methods, or other means or materials similar or equivalent to those described herein can be used in the practice of the present invention, the preferred combinations, compositions, methods, or other means or materials are described herein.

The terms "pet" are synonymous and mean any domesticated animal including, without limitation, cats, dogs, rabbits, guinea pigs, ferrets, hamsters, mice, gerbils, birds, horses, cows, goats, sheep, donkeys, pigs, and the like.

In the context of the present invention, pets such as dogs and cats are preferred. The present invention is more precisely dedicated to cats.

The term "wet pet food" as used herein means a product or composition that is intended for ingestion by a pet and provides at least one nutrient to the animal. A "wet pet food" is here a "nutritionally-balanced" food or diet, meaning that it contains all known required nutrients for the intended recipient or consumer of the food, in appropriate amounts and proportions based, for example, on recommendations of recognized or competent authorities in the field of companion animal nutrition, such as the guidelines of the American Association of Feed Control Officials (AAFCO). Such foods are therefore capable of serving as a sole source of dietary intake to meet essential needs of pets, without the addition of supplemental nutritional sources.

Said wet pet food is no less than about 50% moisture, preferably no less than about 60% moisture, more preferably no less than about 70% moisture, more preferably no less than about 75% moisture. Typically, said foodstuff is less than about 99.9% moisture, preferably less than about 98% moisture. In some embodiments, said foodstuff is less than about 95% moisture, or less than about 90% moisture, or even less than about 85% moisture. In other embodiments, said foodstuff is from about 60% to about 99.9% moisture, preferably from about 70% to about 98% moisture, more preferably from about 72% to about 95% moisture, more preferably from about 75% to about 95% moisture.

The term "wet cat food" means a wet pet food intended for consumption by a cat.

By "chunk-in-X" products", it is meant herein all edible foodstuffs comprising chunks in a preparation (said preparation being also called "the X preparation" with respect to the generic expression "chunk-in-X" used herein), classical examples of which are chunk-in-jelly products, chunk-in-gravy products, and the like. This category of "chunk-in-X" products encompasses also edible forms other than chunks that may be contained in the X preparation such as a jelly, a gravy, and the like. For instance, other forms than chunks may be sliced products, grated products, etc.

The term "loaf" (or loaves) as used herein not only covers loaf but also all wet pet foods usually called terrines, pates, mousses, and the like.

"Beverages" (or drinks) are liquids and liquid preparations that can be lapped by pets, such as milk for cats.

As used herein, the term "low phosphorus wet pet food palatability-enhancing composition" means a wet pet food palatability-enhancing composition having a phosphorus amount as claimed in the present invention. On the contrary, the term "high phosphorus wet pet food palatability-enhancing composition" means a wet pet food palatability-enhancing composition having a phosphorus amount higher than the one claimed in the present invention.

As used herein, a "wet pet food ingredient" is any compound, composition or material that is suitable for pet consumption and which forms part of the wet pet food formulation. Non-limiting examples of pet food ingredients are palatability-enhancing compositions, meat, meat by-products, carbohydrates, grains, animal or vegetable fats, nutrients, preservatives, enzymes, emulsifiers, surfactants, texturing agents, colouring agents, and the like.

In particular, "chunks ingredients" or "X preparation ingredients" and "loaf ingredients" refers to wet pet food ingredients intended to be used to respectively prepare chunks, X preparation and a loaf.

As used herein, the term "palatability" refers to the overall willingness of a pet to eat a certain pet food. Whenever a pet shows a preference, for example, for one of two or more pet foods, the preferred pet food is more "palatable", and has "enhanced palatability". Such preference can arise from any of the pet's senses, but typically is related to, inter alia, taste, aroma, flavor, texture, smell and/or mouth feel.

From a functional point of view, the terms "palatability enhancers (PEs)" and "palatability-enhancing compositions (PECs)" mean any material having the capacity of enhancing the palatability of a food composition to a pet. Typically, a palatability-enhancing composition for pet food is an edible composition that provides an aroma, taste, aftertaste, smell, mouth feel, texture, and/or organoleptic sensation that is appealing or pleasing to the pet.

From a structural point of view, the terms "palatability enhancers (PEs)" and "palatability-enhancing compositions (PECs)" may refer to a single material or a blend of materials that may be natural, processed or unprocessed, synthetic, or part of natural and part of synthetic materials.

Despite their equivalent functional meaning, each of the terms "palatability enhancers (PEs)" and "palatability-enhancing compositions (PECs)" can advantageously be used to identify a specific material or blend of material in order to facilitate a proper distinction between various materials or blends of materials that all have advantageous palatability-enhancing properties.

In particular, for clarity purposes, a "palatability-enhancing composition" as used herein will refer to a blend of materials, comprising one or more "palatability enhancers", the latter term referring more precisely to specific materials. A palatability-enhancing composition can comprise, without limitation, inorganic phosphate compounds, animal digests, fats, proteins, peptides, amino acids, in particular free amino acids, yeasts, sugars, and/or carbohydrates, and optional ingredients, such as nutrients, anti-oxidants, preservatives, surfactants, texturing agents, flavors, etc.

Different methods exist to assess palatability. Examples of such methods involve exposure of pets to pet foods either simultaneously (for example, in side-by-side, free-choice comparisons, e.g., by measuring relative consumption of at least two different pet foods), or sequentially (e.g., using single bowl testing methodologies). Advantageously, at least two different methods may be used to consolidate the thus obtained results on palatability of a given pet food.

Preferably, palatability is measured with pet food intake, typically by using tests such as "two-bowl test" (also called "versus test"), as explained in the Examples. Of course, the person skilled in the art is free to use any other appropriate test than those herein described to determine preference or acceptability. Such alternative tests are well known in the art.

The term "inorganic phosphate compound" as used herein means a chemical compound comprising at least one phosphorus atom. This chemical compound may be natural or synthetic, ionized or not. An inorganic phosphate compound can include phosphoric acid, monophosphates, pyrophosphates, polyphosphates, and combinations thereof.

"Inorganic pyrophosphates" or "pyrophosphates" include alkali metal pyrophosphates, encompassing monoalkali metal pyrophosphates and polyalkali metal pyrophosphates. The formula $M_xH_yP_nO_{3n+1}$ when n=2 is the general formula for alkali metal pyrophosphates. When M is a univalent metal, then x+y=n+2. When M is a divalent metal, then x+y=n. Univalent metal pyrophosphates and divalent metal pyrophosphates can be used herein. Pyrophosphates may be anhydrous or hydrated.

Examples of monoalkali metal pyrophosphates include sodium trihydrogen pyrophosphate, potassium trihydrogen pyrophosphate, calcium hydrogen pyrophosphate, barium hydrogen pyrophosphate, magnesium hydrogen pyrophosphate.

Polyalkali metal pyrophosphates encompass dialkali metal pyrophosphates, trialkali metal pyrophosphates, tetralkali metal pyrophosphates, etc.

Examples of dialkali metal pyrophosphates are disodium dihydrogen pyrophosphate, dipotassium dihydrogen pyrophosphate, dicalcium pyrophosphate, dibarium pyrophosphate, dimagnesium pyrophosphate, dimanganese pyrophosphate, dizinc pyrophosphate.

Trialkali metal pyrophosphates are, for example, trisodium hydrogen pyrophosphate, tripotassium hydrogen pyrophosphate.

The formula $M_xH_yP_nO_{3n+1}$ where n is 3, 4, 5, etc. is the general formula for "polyphosphates".

Examples of polyphosphates are tripolyphosphates and hexapolyphosphates.

Tripolyphosphates include sodium tripolyphosphate, potassium tripolyphosphate, calcium tripolyphosphate, and magnesium tripolyphosphate.

Hexapolyphosphates include sodium hexapolyphosphate, potassium hexapolyphosphate, calcium hexapolyphosphate, and magnesium hexapolyphosphate.

Examples of monophosphates include adenosine monophosphate (AMP), guanosine monophosphate (GMP), inosine monophosphate (IMP), uridine monophosphate (UMP), cytidine monophosphate (CMP).

As used herein, the term "amino acid" means a molecule containing both an amino group and a carboxyl group. In some embodiments, the amino acids are $\alpha$-, $\beta$-, $\gamma$- or $\delta$-amino acids, including their stereoisomers and racemates.

By the term "free amino acids", it is meant herein exogenous (or extrinsic) amino acids that are individually provided as unbound ingredients in a composition. Free amino acids do not form part or are not contained into peptides or proteins or protein hydrolyzates.

The term "sugar" refers to short-chain, soluble carbohydrates. A "reducing sugar" refers to a sugar that is capable of acting as a reducing agent because it has a free aldehyde group or a free ketone group. As an example but without any limitation, sugars can be lactose, maltose, dextrose, glucose syrup, maltodextrin, dextrin, fructose, glyceraldehyde, dihydoxyacetone, xylose, ribose, arabinose, mannose, erythrose, threose, galactose, and the like.

The term "protein hydrolyzate" means a source of proteins that has been chemically and/or enzymatically hydrolyzed (or autolyzed). Typically, a protein hydrolyzate has at least 20%, preferably at least 30%, more preferably at least 40% of proteins based on dry matter of the protein hydrolyzate.

The term "animal digest" means herein material which results from chemical and/or enzymatic hydrolysis of meat or meat by-product obtained from poultry, pork, beef, sheep, lamb and/or fish. As used herein "poultry" encompasses any species or kind of bird, preferably chicken, turkey, duck, or other food species. In some embodiments, an animal digest as used herein is fully consistent with the definition promulgated by the Association Of American Feed Control Officials, Inc. (AAFCO). Animal digest is preferably derived from animal tissues, including cold-blooded marine animals, excluding hair, horns, teeth, hooves, and feathers. The skilled artisan will appreciate that while such tissues are not preferred, trace amounts might be found unavoidably even under good manufacturing practices. Also not included are visceral contents or foreign or fecal matter, although trace contaminant amounts are sometimes present. An animal digest may be dried or not. An animal digest can for example be obtained from chemical and/or enzymatic hydrolysis or autolysis of clean and undecomposed tissue. More particularly, an animal digest can for example be obtained from chemical and/or enzymatic hydrolysis of clean and undecomposed tissue from non-rendered clean parts from the animal other than meat, for example lungs, spleen, kidneys, brain, livers, skin, blood, bone, partially-defatted low-temperature fatty tissue, and stomachs and intestines, typically freed of their contents.

Animal digests may also be referred to as "animal products" or "animal by-products", all these terms being used herein as synonymous.

"Animal fats" are fats of animal origin and marine oils. Fats of animal origin (other than marine) are for example poultry fat, chicken fat, pork fat, beef tallow, lamb tallow, milk fat or milk-derived fat, such as butter, and the like, as well as by-products thereof. Marine oils are typically tuna oil, sardine oil, salmon oil, herring oil, mackerel oil, sand eel oil, trout oil, tilapia oil, catfish oil, anchovy oil, menhaden oil and the like, as well as by-products thereof.

"Vegetable oils" are typically canola oil, soybean oil, corn oil, olive oil, sunflower oil, linseed oil, palm oil, rapeseed oil, sesame oil, coconut oil, peanut oil, safflower oil, and the like, as well as by-products thereof.

Examples of carbohydrates include polysaccharides, fibers, starches, and the like.

Examples of grains are corn, milo, alfalfa, wheat, barley, rice, soy, and the like.

Examples of nutrients include, without limitation, vitamins, minerals and electrolytes, such as vitamins A, C, E, B12, D3, folic acid, D-biotin, cyanocobalamin, niacinamide, thiamine, riboflavin, pyridoxine, menadione, beta-carotene, calciumpantothenate, choline, inositol, calcium, potassium, sodium, zinc, iron, manganese, copper, iodine, and the like.

Preservatives are, for example, tocopherols, rosemary extract (and in particular carnosic acid), hydrolysable gallotannins, hydroxytyrosol, quercetin, potassium sorbate, sorbic acid, BHA, BHT, propyl gallate, octyl gallate and the like.

Texturing agents are, for example, alginate, *cassia* gum, carragheenan, xanthan gum, starch and derivatives, guar gum, carob gum, cellulose and derivatives, agar, pectin, gelatine and the like.

"Surfactants" are molecules that are surface active. They typically have a hydrophilic portion (e.g., one or more head groups) and a hydrophobic (or lipophilic) portion (e.g., one or more tails). They are classified in various ways, for example according to their hydrophilic-lipophilic balance (HLB). They can also or alternatively be classified as non-ionic, ionic or zwitterionic compounds based on the presence or absence of formally-charged in the head group (s). Surfactants are well-known in the art. One can cite, for example, Tween surfactants. Surfactants include, without limitation, emulsifiers and wetting agents. In some instances, the terms "surfactants" and "emulsifiers" can be used interchangeably.

The term "single package" means that the components of a kit are physically associated in or with one or more containers and considered a unit for manufacture, distribution, sale, or use. A single package may be containers of individual components physically associated such that they are considered a unit for manufacture, distribution, sale, or use.

As used herein, a "means for communicating information or instructions" is a kit component under any form suitable for providing information, instructions, recommendations, and/or warranties, etc. Such a means can comprise a document, digital storage media, optical storage media, audio presentation, visual display containing information. The means of communication can be a displayed web site, brochure, product label, package insert, advertisement, visual display, etc.

DESCRIPTION OF SOME EMBODIMENTS OF THE INVENTION

The present inventors showed for the first time that wet pet food enhancing compositions having low amounts of phosphorus can provide to wet pet foods an enhanced palatability when using free amino acids, sugars and phosphorus in a specific ratio.

Wet Pet Food Palatability-Enhancing Composition

The present invention thus concerns a wet pet food palatability-enhancing composition comprising at least:
one or more free amino acids A1,
one or more sugars A2, and
one or more inorganic phosphate compounds B with an amount P of phosphorus, wherein the amount of phosphorus is from 1% to 5% based on the total weight of said wet pet food palatability-enhancing composition and wherein the ratio R1 of A1/(A1+A2+P) is superior to 0.30 and inferior to 0.45.

The present inventors have found that it is essential to comply with this ratio R1 in order to obtain a low phosphorus composition providing a significantly enhanced palatability. In particular, wet pet foods comprising low phosphorus compositions having these specific ingredients while providing this specific ratio R1, are more palatable than wet pet foods comprising low phosphorus compositions that do not share these essential features and can also be more palatable than wet pet foods comprising high phosphorus compositions.

However, a minimum amount of 1% phosphorus is essential in order to enhance palatability. Indeed, even when complying with the above-described ratio R1, palatability is not enhanced if the amount of phosphorus is below 1% based on the total weight of said wet pet food palatability-enhancing composition.

In a particular embodiment, "palatability-enhancing composition" refers to a composition of the invention increasing the wet pet food intake (of a wet pet food), in particular compared to another composition out of the invention.

Preferably, the wet pet food palatability-enhancing composition is a wet cat food palatability-enhancing composition.

In a preferred embodiment, the ratio R1 of A1/(A1+A2+P) is inferior to 0.40.

In a preferred embodiment, said one or more free amino acids A1 are selected from the group consisting of glycine, cysteine, aspartic acid, lysine, tryptophan, glutamic acid, phenylalanine, isoleucine, valine, leucine, methionine, threonine, and combinations thereof. More preferably, said one or more free amino acids A1 are selected from the group consisting of glycine, cysteine, aspartic acid, lysine, tryptophan, phenylalanine, isoleucine, valine, leucine, methionine, threonine, and combinations thereof. Still more preferably, said one or more free amino acids A1 are selected from the group consisting of glycine, cysteine, lysine, glutamic acid, methionine, threonine, and combinations thereof.

In a preferred embodiment, said one or more free amino acids A1 are in an amount from 2% to 30%, preferably from 2% to 25%, more preferably from 2% to 20% based on the total weight of said wet pet food palatability-enhancing composition.

Advantageously, at least one sugar of said one or more sugars A2 is a reducing sugar. Preferably, said one or more sugars A2 are reducing sugar(s). Reducing sugars can indeed react with free amino acids A1 so as to produce flavors through Maillard reaction, thus enhancing palatability of said composition.

The sugars A2 are preferably selected from the group consisting of lactose, maltose, dextrose, fructose, glucose syrup, xylose, lactose, saccharose, ribose, and combinations thereof. More preferably, said sugars are selected from the group consisting of dextrose, glucose syrup, xylose, lactose, saccharose, ribose, and combinations thereof.

More preferably, at least xylose is used since it can highly react with sugars, especially reducing sugars. Ribose may also or alternatively be used in a satisfying manner. However, using ribose will result in a higher, and possibly prohibitive, cost of the foodstuff. In addition, or yet alternatively, glucose syrup, lactose or dextrose may be conveniently used since it is costless and easily available.

In a preferred embodiment, said one or more sugars A2 are in an amount from 2 to 50%, preferably from 2 to 40%, more preferably from 2 to 35% based on the total weight of said wet pet food palatability-enhancing composition.

In a preferred embodiment, said one or more inorganic phosphate compounds B are selected from the group consisting of phosphoric acid, monophosphates, pyrophosphates, polyphosphates and combinations thereof. Yet preferably, said one or more inorganic phosphate compounds B are selected from the group consisting of pyrophosphates, polyphosphates and combinations thereof.

A preferred inorganic phosphate compound according to the present invention is a pyrophosphate compound selected from the group consisting of disodium pyrophosphate, trisodium pyrophosphate, tetrasodium pyrophosphate, dipotassium pyrophosphate, tripotassium pyrophosphate, tetrapotassium pyrophosphate, tetraferric pyrophosphate, and combinations thereof.

Said one or more inorganic phosphate compounds B are preferably present in an amount from 5 to 30%, preferably from 5 to 25%, more preferably from 5 to 20% based on the total weight of said wet pet food palatability-enhancing composition.

The amount of phosphorus is from 1% to 5% based on the total weight of said wet pet food palatability-enhancing composition. Preferably, the amount of phosphorus is from 1.5% to 5%, more preferably from 2% to 5%, even more preferably from 2.5% to 4.5% based on the total weight of said wet pet food palatability-enhancing composition.

In a particular embodiment, the wet pet food palatability-enhancing composition comprises from 15 to 80%, preferably from 20 to 75% of said free amino acids, sugars and inorganic phosphate compounds.

In another particular embodiment, the wet pet food palatability-enhancing composition consists of said free amino acids, sugars and inorganic phosphate compounds.

In a preferred embodiment, the wet pet food palatability-enhancing composition further comprises at least one protein hydrolyzate C. In a preferred embodiment, said protein hydrolyzate is an animal digest, a feather hydrolyzate, a vegetable hydrolyzate, a yeast hydrolyzate, a yeast extract or a combination thereof. Said animal digest can be selected from the group consisting of poultry product or by-product digests, pork product or by-product digests, fish by-product digests, and combinations thereof.

Advantageously, said protein hydrolyzate C is in an amount from 15 to 85%, preferably from 20 to 80%, more preferably from 25% to 80% based on the total weight of said wet pet food palatability-enhancing composition.

In a particular embodiment, the wet pet food palatability-enhancing composition comprises at least (% based on the total weight of said wet pet food palatability-enhancing composition):
  from 2 to 30%, preferably from 2 to 25%, more preferably from 2 to 20% of said free amino acids A1,
  from 2 to 50%, preferably from 2 to 40%, more preferably from 2 to 35% of said sugars A2,
  from 5 to 30%, preferably from 5 to 25%, more preferably from 5 to 20% of said inorganic phosphate compounds B, and
  optionally from 15 to 85%, preferably from 20 to 80%, more preferably from 25% to 80% of said protein hydrolyzate C.

Advantageously, the wet pet food palatability-enhancing composition has a ratio (A1+P)/(A2+C) inferior to 1, preferably comprised between 0.05 and 1, more preferably comprised between 0.05 and 0.9, more preferably comprised between 0.05 and 0.8, more preferably comprised between 0.05 and 0.7, more preferably comprised between 0.05 and 0.6.

In a particular embodiment, the wet pet food palatability-enhancing composition further comprises at least one fat, preferably selected from the list consisting of animal fats and vegetable oils. In a preferred embodiment, the fat is selected from the group consisting of poultry fat, chicken fat, pork fat, lamb tallow, beef tallow, milk fat or milk-derived fat, marine oils, and combinations thereof.

The wet pet food palatability-enhancing composition can be dry or liquid. The wet pet food palatability-enhancing composition can also be frozen.

As a first example, the wet pet food palatability-enhancing composition is a dry wet pet food palatability-enhancing composition.

As a second example, the wet pet food palatability-enhancing composition is a liquid wet pet food palatability-enhancing composition.

As a third example, the wet pet food palatability-enhancing composition is a frozen wet pet food palatability-enhancing composition. This enhances stabilization and facilitates the use of the wet pet food palatability-enhancing composition.

Method for Producing a Wet Pet Food Palatability-Enhancing Composition

Another aspect of the present invention concerns a method for producing a wet pet food palatability-enhancing composition as above described, said method comprising the steps of:
  a) providing said at least one or more free amino acids A1, one or more sugars A2, and one or more inorganic phosphate compounds B;
  b) if necessary, grinding one or more of said ingredients of step a);
  c) mixing said ingredients obtained from step a) and/or b); and
  d) obtaining said wet pet food palatability-enhancing composition.

In a particular embodiment, a protein hydrolyzate is also provided in step a).

In particular embodiments, said method further comprises one or more intermediate steps between steps c) and d) above, such as:
  e) thermally treating the mixture resulting from step c); and/or
  f) further stabilizing the resulting composition of step c) or e) (by, e.g., acidification, addition of preservatives, and the like); and/or
  g) drying the composition obtained from step c) or e) or f); and/or
  h) freezing the composition obtained from step c) or e) or f).

In a yet particular embodiment, two or more palatability-enhancing compositions or intermediates thereof (such as the mixtures resulting from step c) or e) or f) or g) or h)) can be mixed together in order to obtain a final palatability-enhancing composition for use in pet food. Should a drying step g) be performed, then said two or more palatability-enhancing compositions or intermediates thereof are advantageously mixed before said step g).

The person skilled in the art will be able to select appropriate steps, adapt said steps if need be, select appropriate order for the selected steps, given that some steps may be performed concomitantly according to usual practice in the art.

Wet Pet Food

Another aspect of the present invention concerns a wet pet food having enhanced palatability comprising a wet pet food palatability-enhancing composition as above described.

Preferably, the wet pet food is a wet cat food.

Said wet pet food is selected from the group consisting of chunk-in-X product, such as a chunk-in-jelly product or a chunk-in-gravy product, chunks, loaf, chunks-in-loaf or beverages.

In a particular embodiment, beverages are excluded. Said wet pet food can thus be a chunk-in-X product, such as a chunk-in-jelly product or a chunk-in-gravy product, chunks, loaf or chunks-in-loaf.

Said wet pet food can comprise from 0.5% to 50%, preferably from 0.5% to 40%, more preferably from 0.5% to 30%, more preferably from 0.5% to 20%, %, more preferably from 0.5% to 10%, more preferably from 0.5 to 5%, more preferably from 0.5% to 4% of said wet pet food palatability-enhancing composition (% based on the total weight of said wet pet food).

The skilled person will understand that this amount can vary, for example regarding the phosphorus amount of the wet pet food palatability-enhancing composition so as to keep a low phosphorus amount in the wet pet food.

In a particular embodiment, the wet pet food comprises 0.05% to 5%, more preferably from 0.5% to 3%, more preferably from 0.5% to 2%, more preferably from 0.5% to 1% of phosphorus (% based on the total weight of said wet pet food).

Advantageously, the wet pet food comprises from 0.05% to 0.5%, preferably from 0.05% to 0.3%, more preferably from 0.05% to 0.2% of phosphorus (% based on the total weight of said wet pet food). The wet pet food is thus appropriate for pets, such as cats, suffering from renal disease.

Advantageously, sugars, free amino acids and phosphorus comprised in the wet pet food all provide from the wet pet food palatability-enhancing composition.

Method for Producing a Wet Pet Food

Another aspect of the present invention concerns a method for producing a wet pet food, preferably a wet cat food, having enhanced palatability comprising:
 a) adding to a wet pet food, a wet pet food palatability-enhancing composition as above described; and
 b) obtaining a wet pet food having enhanced palatability.

According to a first embodiment, the wet pet food is chunks. The wet pet food having enhanced palatability obtained at step b) is thus chunks having enhanced palatability.

According to this first embodiment, step a) can comprise the following steps consisting of:
 a1) providing a wet pet food palatability-enhancing composition as above described and chunks ingredients,
 a2) mixing said wet pet food palatability-enhancing composition and said chunks ingredients,
 a3) cooking and slicing the thus obtained mixture of step a2).

Chunks ingredients comprise at least meat and/or meat by-products, carbohydrates and/or grains, texturing agents.

Advantageously, cooking can be performed before slicing, or slicing can be performed before cooking in step a3).

It has to be understood that even if this first embodiment is disclosed through chunks, other forms than chunks are clearly encompassed. For instance, other forms than chunks may be sliced products, grated products, etc.

Preferably, the method comprises a step c) of sealing and retorting the thus obtained chunks having enhanced palatability in a container, such as cans or pouches or trays.

According to a second embodiment, the wet pet food is a chunk-in-X product, such as a chunk-in-jelly product or a chunk-in-gravy product. The wet pet food having enhanced palatability obtained at step b) is thus a chunk-in-X product, such as a chunk-in-jelly product or a chunk-in-gravy product, having enhanced palatability.

For this second embodiment, step a) can typically be performed by incorporating the palatability-enhancing composition in the X preparation, such as a gravy or jelly preparation, and/or in chunks.

Therefore, according to this second embodiment, step a) can comprise the following steps consisting of:
 a1) providing a wet pet food palatability-enhancing composition as above described, chunks ingredients and X preparation ingredients,
 a2) mixing said chunks ingredients,
 a3) cooking and slicing the thus obtained mixture of chunks ingredients of step a2),
 a4) mixing said X preparation ingredients,
 a5) cooking the thus obtained mixture of X preparation ingredients of step a4),
wherein said wet pet food palatability-enhancing composition is incorporated in step a2) and/or in step a4).

Chunks ingredients preferably comprise at least meat and/or meat by-products, carbohydrates and/or grains, texturing agents.

X preparation ingredients preferably comprise water, texturing agents and optionally colorants and/or nutrients.

Advantageously, cooking can be performed before slicing, or slicing can be performed before cooking in step a3).

In the same way as for the first embodiment, it has to be understood that this category of "chunk-in-X" products encompasses also edible forms other than chunks that may be contained in the X preparation such as a jelly, a gravy, and the like. For instance, other forms than chunks may be sliced products, grated products, cold extruded products etc.

Preferably, the method comprises a step c) of sealing and retorting the thus obtained chunk-in-X having enhanced palatability in a container, such as cans or pouches or trays.

According to a third embodiment, the wet pet food is a loaf. The wet pet food having enhanced palatability obtained at step b) is thus a loaf having enhanced palatability.

According to this third embodiment, step a) can comprise the steps consisting of:
 a1) providing a wet pet food palatability-enhancing composition as above described and loaf ingredients,
 a2) mixing said loaf ingredients and said wet pet food palatability-enhancing composition,
 a3) cooking the mixture obtained at step a2) so as to obtain a loaf.

Loaf ingredients preferably comprise meat and/or meat by-products, carbohydrates and/or grains, texturing agents, water.

Preferably, the method comprises a step c) of sealing and retorting the thus obtained loaf having enhanced palatability in a container, such as cans or pouches or trays.

Advantageously, the step a3) and c) can be performed simultaneously. Cooking is thus made by sealing and retorting the mixture obtained at step a2).

According to a fourth embodiment, the wet pet food is chunks-in-loaf.

Therefore, according to this fourth embodiment, step a) can comprise the following steps consisting of:
 a1) providing a wet pet food palatability-enhancing composition as above described, chunks and loaf,
 a2) adding said wet pet food palatability-enhancing composition to the chunks and/or to the loaf.

a3) adding said chunks to said loaf.

The wet pet food having enhanced palatability obtained at step b) is thus chunks-in-loaf having enhanced palatability.

Step a2) can advantageously be performed as described in the first and/or the second embodiment.

Preferably, the method comprises a step c) of sealing and retorting the thus obtained chunk-in-loaf having enhanced palatability.

These methods are non limitative and the person skilled in the art will be able to select appropriate steps, adapt said steps if need be, add some other steps, select appropriate order for the selected steps, given that some steps may be performed concomitantly according to usual practice in the art.

Method for Enhancing the Palatability of a Wet Pet Food

Yet another aspect of the present invention is related to a method for enhancing the palatability of a wet pet food, wherein said method comprises:
- a) adding to a wet pet food, a wet pet food palatability-enhancing composition as above described; and
- b) obtaining a wet pet food having enhanced palatability.

The above-mentioned technical features recited for the method for producing a wet pet food having enhanced palatability can also apply to this method for enhancing the palatability of a wet pet food.

Method for Feeding Pets

Another aspect of the present invention concerns a method for feeding a pet comprising at least:
- a) providing a wet pet food as above described; and
- b) feeding said wet pet food to the pet.

Preferably, said pet is a cat.

In a particular embodiment, the pet is suffering from renal deficiency.

Method for Increasing Wet Pet Food Intake

Another aspect of the present invention concerns a method for increasing wet pet food intake of a pet comprising at least the steps consisting of:
- a) providing a wet pet food as above described; and
- b) feeding said wet pet food to the pet.

The wet pet food intake is increased in particular compared to another wet pet food which does not comprise a composition according to the invention.

Preferably, said pet is a cat.

In a particular embodiment, the pet is suffering from renal deficiency.

Kit for Enhancing the Palatability of a Wet Pet Food

Another aspect of the present invention concerns a kit for enhancing the palatability of a wet pet food comprising, in one or more containers in a single package:
- a wet pet food palatability-enhancing composition as above described;
- optionally a wet pet food;
- optionally a means for communicating information about or instructions for using said wet pet food palatability-enhancing composition and, optionally, said pet food ingredient.

The present invention will be further described by reference to the following examples, which are presented for the purpose of illustration only and are not intended to limit the scope of the invention.

EXAMPLES

1. Materials and Methods 1.1. Preparation of Wet Pet Food Palatability-Enhancing Compositions Wet pet food palatability-enhancing compositions are hereafter named PEC.

1.1.1. Preparation of Powdered Palatability-Enhancing Compositions

One or more free amino acids, one or more sugars, one or more inorganic phosphate compounds and possibly one or more powdered protein hydrolyzates were blended for 10 min using a pilote scale paddle mixer (Forberg, France).

1.1.2. Preparation of Frozen Palatability-Enhancing Compositions

A liquid protein hydrolyzate was blended to one or more free amino acids, one or more sugars, one or more inorganic phosphate compounds. Optionally, one or more other powdered protein hydrolyzates were blended for 10 min using a lab scale paddle mixer (Turbotest). The final composition was then frozen.

1.2. Preparation of Wet Pet Foods 1.2.1. Preparation of Chunks-in-Jelly

| Pork and poultry tissues | 86.52% |
| Salt | 0.60% |
| Vitamins & minerals premix | 0.60% |
| Wheat flour | 5.00% |
| Texturing agent | 0.65% |
| Water | 6.63% |

The pork and poultry tissues were ground and the water was added. Afterwards all the powdered ingredients were poured into the slurry, which was then ground and mixed. A cooking step was performed at 95° C., 100% humidity for 4 min. The mixture was finally cut into 8 mm chunks, which were added in pouches.

The Jelly was Manufactured Using the Following Protocol:

Water (96.9%) was heated to 80° C. Colouring agent (0.1%), texturing agents (1.0%) and the wet pet food palatability-enhancing composition (2%—prepared according to 1.1.1) were mixed together. The powders were then poured into the hot jelly which was mixed. The jelly was then added into the same pouches. A ratio of 50:50 chunks:jelly (weight/weight) is respected.

The Chunks-in-Jelly Product was Manufactured Using the Following Protocol:

The pouches containing the chunks and the jelly were then sealed and retorted (heating to 129° C.-22 min, maintaining at 127° C.-17 min, cooling to 50° C.-16 min).

1.2.2. Preparation of Loaf

Two loaf products for cats were manufactured as follows.

Pork and poultry tissues: 46.08%

Frozen wet pet food palatability-enhancing composition: 4.00%

Texturing agents: 0.98%

Mix of vitamins & minerals: 0.30%

Wheat flour: 5.00%

Water: 43.64%

The pork and poultry tissues were ground and mixed. Then the other materials and the wet pet food palatability-enhancing composition (prepared according to 1.1.2) were added and the resulting blend was ground.

The slurry was transferred to a vacuum filler and dosed into 400 g cans. The cans were sealed and retorted (heating to 127° C.-20 min, maintaining at 127° C.-67 min, cooling to 30° C.-20 min).

1.3. Determination of Palatability with a Two-Bowl Test

Operating Method of the Test:

The palatability of two products was assessed at Panelis (France), using a two-bowl test (two short meals per day for two days) on 40 cats. The two foods were presented at the same time to each cat in an individual loose box. The position of each wet pet food in the loose box was switched at each meal to avoid a choice lead by handedness. The final intake of each food was measured. The data were summed for each day. The results are shown as relative consumption ratios of A or B.

If animals have higher or lower consumption compared to predetermined values (which are function of, e.g., the animal weight and/or metabolism), they are not taken into account into statistical treatment.

Statistical Analysis

Statistical analysis was used to determine if there was a significant difference between the 2 ratios. A Student's t-test with 3 error thresholds, namely 5%, 1% and 0.1%, was performed.

Significance levels are noted as below:

| | | |
|---|---|---|
| NS | not significant | ($p > 0.05$) |
| * | significant | ($p \leq 0.05$) |
| ** | highly significant | ($p \leq 0.01$) |
| *** | very highly significant | ($p \leq 0.001$) |

2. Results 2.1. Example 1: The Use of a Low Phosphorus Palatability-Enhancing Composition Having a R1 Ratio According to the Invention Enhances Palatability of a Wet Pet Food Compared to the Use of a Low Phosphorus Palatability-Enhancing Composition Having a R1 Ratio Out of the Invention Wet pet foods were prepared according to the process mentioned in paragraph 1.2.1.

Control diets 1 and 2 are wet pet foods comprising 1% of a low phosphorus palatability-enhancing composition having a R1 ratio out of the invention as shown in Table 1.

Experimental diets 1 and 2 are wet pet foods comprising 1% of a low phosphorus palatability-enhancing composition having a R1 ratio according to the invention as shown in Table 1.

TABLE 1

| | PEC of Control Diet 1 | PEC of Experimental Diet 1 | PEC of Control Diet 2 | PEC of Experimental Diet 2 |
|---|---|---|---|---|
| Phosphorus (P) (%) | 4.1 | 4.0 | 4.3 | 4.3 |
| A1 | 6.9 | 17.0 | 10.0 | 17.0 |
| A2 | 15.0 | 31.0 | 17.0 | 31.0 |
| Ratio R1 (A1/(A1 + A2 + P)) | 0.27 | 0.33 | 0.22 | 0.32 |
| (A1 + P)/(A2 + C) | 0.15 | 0.32 | 0.20 | 0.32 |

Versus tests were performed to compare palatability to cats of the control diet 1 and the experimental diet 1, and to compare palatability to cats of the control diet 2 and the experimental diet 2. The results are presented in table 2.

TABLE 2

| | | | Consumption ratio | | |
|---|---|---|---|---|---|
| Test Day | Food A | Food B | % A | % B | Significance |
| Day 1 | Control Diet 1 | Experimental Diet 1 | 37 | 63 | *** |
| Day 2 | Control Diet 1 | Experimental Diet 1 | 39 | 61 | ** |
| Day 1 | Control Diet 2 | Experimental Diet 2 | 43 | 57 | ** |
| Day 2 | Control Diet 2 | Experimental Diet 2 | 40 | 60 | *** |

As shown in Table 2, consumptions were very highly significantly different between the control diets and the experimental diets, showing a preference for the experimental diets.

This demonstrates that the use of a low phosphorus palatability-enhancing composition enhances palatability of a wet pet food only when the R1 ratio is superior to 0.30.

2.2. Example 2: The Use of a Low Phosphorus Palatability-Enhancing Composition Having a R1 Ratio According to the Invention Enhances Palatability of a Wet Pet Food Compared to the Use of a Palatability-Enhancing Composition Having a R1 Ratio According to the Invention but Having a Too Low Amount of Phosphorus Wet pet foods were prepared according to the process mentioned in paragraph 1.2.2.

Control diet 3 is a wet pet food comprising 4% of a low phosphorus palatability-enhancing composition having a R1 ratio according to the invention but having a too low amount of phosphorus, i.e. inferior to 1%, as shown in Table 3.

Experimental diet 3 is a wet pet food comprising 4% of a low phosphorus palatability-enhancing composition having a R1 ratio according to the invention, as shown in Table 3.

TABLE 3

| | PEC of Control Diet 3 | PEC of Experimental Diet 3 |
|---|---|---|
| Phosphorus (P) (%) | 0.7 | 2.0 |
| A1 | 0.8 | 2.5 |
| A2 | 0.9 | 2.6 |
| Ratio R1 (A1/(A1 + A2 + P)) | 0.35 | 0.35 |
| (A1 + P)/(A2 + C) | 0.02 | 0.06 |

Versus tests were performed to compare palatability to cats of the control diet 3 and the experimental diet 3. The results are presented in table 4.

TABLE 4

| | | | Consumption ratio | | |
|---|---|---|---|---|---|
| Test Day | Food A | Food B | % A | % B | Significance |
| Day 1 | Control Diet 3 | Experimental Diet 3 | 35 | 65 | *** |
| Day 2 | Control Diet 3 | Experimental Diet 3 | 39 | 61 | *** |

As shown in Table 4, consumptions were very highly significantly different between the control diet 3 and the experimental diet 3, showing a preference for the experimental diet 3.

This demonstrates that a minimum amount of 1% phosphorus is essential in order to enhance palatability. Indeed, even when complying with the above-described ratio R1, palatability is not enhanced if the amount of phosphorus is below 1% based on the total weight of said wet pet food palatability-enhancing composition.

2.3. Example 3: The Use of a Low Phosphorus Palatability-Enhancing Composition Having a R1 Ratio According to the Invention can Enhance Palatability of a Wet Pet Food Compared to the Use of a High Phosphorus Palatability-Enhancing Composition Having a R1 Ratio According to the Invention Wet pet foods were prepared according to the process mentioned in paragraph 1.2.1.

Control diet 4 is a wet pet food comprising 1% of a high phosphorus palatability-enhancing composition having a R1 ratio according to the invention as shown in Table 5.

Experimental diet 4 is a wet pet food comprising 1% of a low phosphorus palatability-enhancing composition having a R1 ratio according to the invention as shown in Table 5.

TABLE 5

|  | PEC of Control Diet 4 | PEC of Experimental Diet 4 |
| --- | --- | --- |
| Phosphorus (P) (%) | 11.6 | 4.0 |
| A1 | 14.1 | 17.0 |
| A2 | 15.1 | 31.0 |
| Ratio R1 (A1/(A1 + A2+ P)) | 0.34 | 0.33 |
| (A1 + P)/(A2 + C) | 0.68 | 0.32 |

Versus tests were performed to compare palatability to cats of the control diet 4 and the experimental diet 4. The results are presented in table 6.

TABLE 6

|  |  |  | Consumption ratio | | |
| --- | --- | --- | --- | --- | --- |
| Test Day | Food A | Food B | % A | % B | Significance |
| Day 1 | Control Diet 4 | Experimental Diet 4 | 27 | 73 | *** |
| Day 2 | Control Diet 4 | Experimental Diet 4 | 34 | 66 | *** |

As shown in Table 6, consumptions were very highly significantly different between the control diet 4 and the experimental diet 4, showing a preference for the experimental diet 4.

This demonstrates that the use of a low phosphorus palatability-enhancing composition having a R1 ratio according to the invention can even enhance palatability of a wet pet food compared to the use of a high phosphorus palatability-enhancing composition having a R1 ratio according to the invention.

2.4. Example 4: A Wet Pet Food Comprising a High Phosphorus Palatability-Enhancing Composition Having a R1 Ratio According to the Invention is as Palatable as a Wet Pet Food Comprising a High Phosphorus Palatability-Enhancing Composition Having a R1 Ratio Out of the Invention Wet pet foods were prepared according to the process mentioned in paragraph 1.2.2.

Control diet 5 is a wet pet food comprising 2% of a high phosphorus palatability-enhancing composition having a R1 ratio according to the invention as shown in Table 7.

Control diet 6 is a wet pet food comprising 2% of a high phosphorus palatability-enhancing composition having a R1 ratio out of the invention as shown in Table 7.

TABLE 7

|  | PEC of Control Diet 5 | PEC of Control Diet 6 |
| --- | --- | --- |
| Phosphorus (P) (%) | 11.6 | 7.3 |
| A1 | 15.2 | 9.0 |
| A2 | 15.0 | 16.0 |
| Ratio R1 | 0.36 | 0.28 |
| (A1 + P)/(A2 + C) | 0.73 | 0.27 |

Versus tests were performed to compare palatability to cats of the control diet 5 and the control diet 6. The results are presented in table 8.

TABLE 8

|  |  |  | Consumption ratio | | |
| --- | --- | --- | --- | --- | --- |
| Test Day | Food A | Food B | % A | % B | Significance |
| Day 1 | Control Diet 5 | Control Diet 6 | 46 | 54 | NS |
| Day 2 | Control Diet 5 | Control Diet 6 | 48 | 52 | NS |

As shown in Table 8, consumptions were not significantly different between the control diet 5 and the control diet 6.

This demonstrates that a wet pet food comprising a high phosphorus palatability-enhancing composition having a R1 ratio according to the invention is as palatable as a wet pet food comprising a high phosphorus palatability-enhancing composition having a R1 ratio out of the invention. The R1 ratio does thus not influence palatability of high phosphorus palatability-enhancing composition.

The invention claimed is:

1. A wet pet food palatability-enhancing composition comprising at least:
   one or more free amino acids A1,
   one or more sugars A2, and
   one or more inorganic phosphate compounds B with an amount P of phosphorus,
   wherein the amount P of phosphorus is from 1% to 5% based on the total weight of said wet pet food palatability-enhancing composition, and
   wherein the ratio R1 of A1/(A1+A2+P) is superior to 0.30 and inferior to 0.45 and
   wherein said wet pet food palatability-enhancing composition enhances the palatability of wet pet food to cats.

2. The wet pet food palatability-enhancing composition according to claim 1, wherein said ratio R1 of A1/(A1+A2+P) is inferior to 0.40.

3. The wet pet food palatability-enhancing composition according to claim 1, wherein said one or more free amino acids A1 are selected from the group consisting of glycine, cysteine, aspartic acid, lysine, tryptophan, glutamic acid, phenylalanine, isoleucine, valine, leucine, methionine, threonine, and combinations thereof.

4. The wet pet food palatability-enhancing composition according to claim 1, wherein said one or more amino acids A1 are in an amount from 2 to 30%, based on the total weight of said wet pet food palatability-enhancing composition.

5. The wet pet food palatability-enhancing composition according to claim 1, wherein said one or more sugars A2 are selected from the group consisting of lactose, maltose, dextrose, fructose, glucose syrup, xylose, lactose, saccharose, ribose, and combinations thereof.

6. The wet pet food palatability-enhancing composition according to claim 1, wherein said one or more sugars A2 are in an amount from 2 to 50%, based on the total weight of said wet pet food palatability-enhancing composition.

7. The wet pet food palatability-enhancing composition according to claim 1, wherein said one or more inorganic phosphate compounds B are selected from the group consisting of phosphoric acid, monophosphates, pyrophosphates, polyphosphates, and combinations thereof.

8. The wet pet food palatability-enhancing composition according to claim 1, wherein said one or more inorganic phosphate compounds B are in an amount from 5 to 30%, based on the total weight of said wet pet food palatability-enhancing composition.

9. The wet pet food palatability-enhancing composition according to claim 1, further comprising at least one protein hydrolyzate.

10. A method for producing a wet pet food having enhanced palatability comprising:
  a) adding to a wet pet food, a wet pet food palatability-enhancing composition according to claim 1; and
  b) obtaining a wet pet food having enhanced palatability.

11. The wet pet food palatability-enhancing composition according to claim 1, wherein said one or more free amino acids A1 are in an amount from 2 to 25% based on the total weight of said wet pet food palatability-enhancing composition.

12. The wet pet food palatability-enhancing composition according to claim 1, wherein said one or more free amino acids A1 are in an amount from 2 to 20% based on the total weight of said wet pet food palatability-enhancing composition.

13. The wet pet food palatability-enhancing composition according to claim 1, wherein said one or more sugars A2 are in an amount from 2 to 40% based on the total weight of said wet pet food palatability-enhancing composition.

14. The wet pet food palatability-enhancing composition according to claim 1, wherein said one or more sugars A2 are in an amount from 2 to 35% based on the total weight of said wet pet food palatability-enhancing composition.

15. The wet pet food palatability-enhancing composition according to claim 1, wherein said one or more inorganic phosphate compounds B are in an amount from 5 to 25% based on the total weight of said wet pet food palatability-enhancing composition.

16. The wet pet food palatability-enhancing composition according to claim 1, wherein said one or more inorganic phosphate compounds B are in an amount from 5 to 20% based on the total weight of said wet pet food palatability-enhancing composition.

* * * * *